Z. A. BRUEGGER.
MOTOR.
APPLICATION FILED DEC. 4, 1915.
1,182,632.
Patented May 9, 1916.
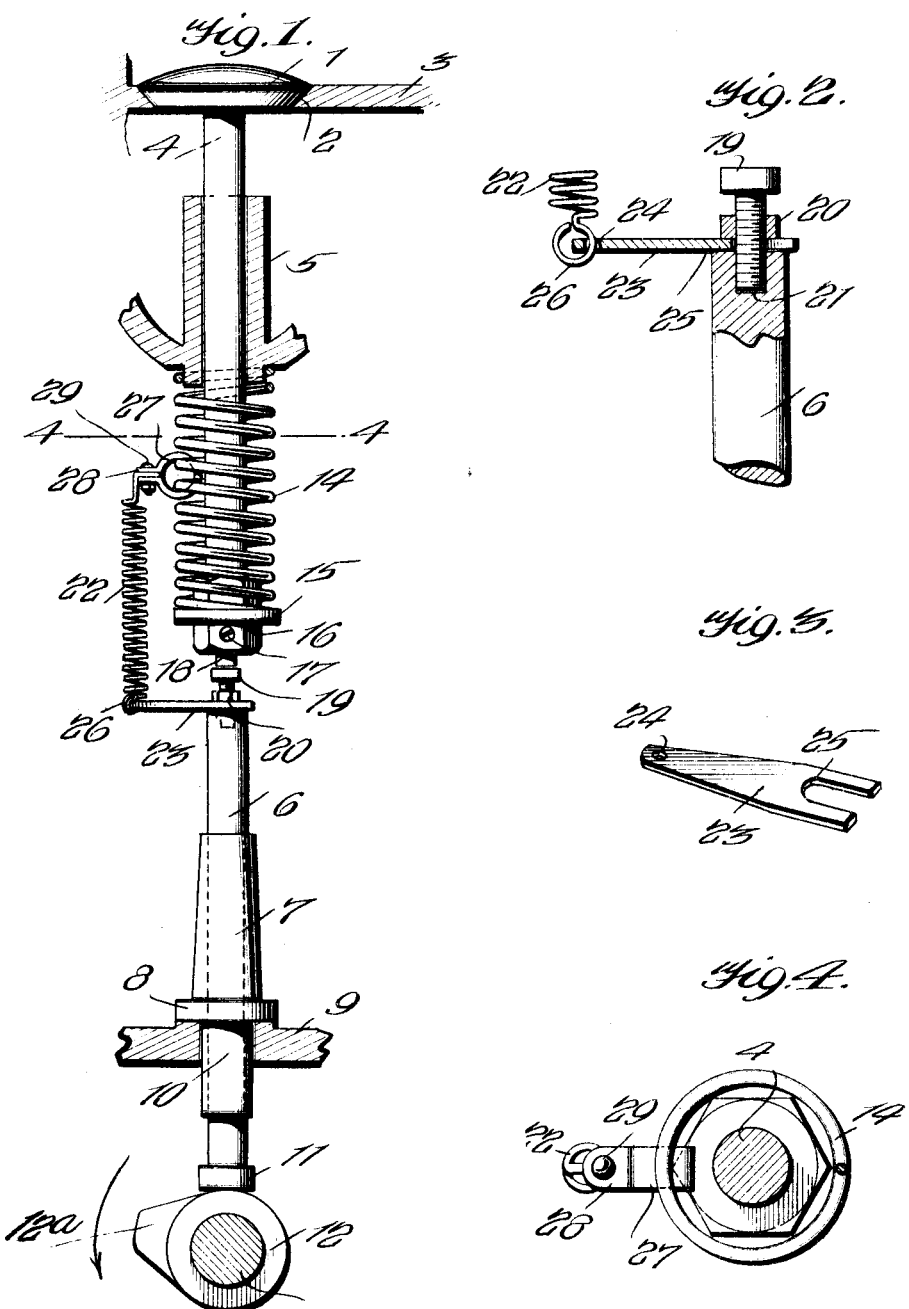
WITNESSES:
INVENTOR
ZENO A. BRUEGGER,
BY Munn & Co
ATTORNEYS

UNITED STATES PATENT OFFICE.

ZENO ARNO BRUEGGER, OF WILLISTON, NORTH DAKOTA.

MOTOR.

1,182,632.   Specification of Letters Patent.   Patented May 9, 1916.

Application filed December 4, 1915. Serial No. 65,011.

*To all whom it may concern:*

Be it known that I, ZENO A. BRUEGGER, a citizen of the United States, and a resident of Williston, in the county of Williams and State of North Dakota, have invented certain new and useful Improvements in Motors, of which the following is a specification.

My invention is an improvement in motors, and the invention has for its object to provide mechanism in connection with the puppet valves of motors, for eliminating the noise generated between the tappet and the valve during the operation of the valve.

In the drawings: Figure 1 is a vertical section through the valve operating mechanism; Fig. 2 is an enlarged detail of the spring connection; Fig. 3 is a perspective view of the connecting plate for the spring, and Fig. 4 is a section on the line 4—4 of Fig. 1.

The present embodiment of the invention is shown in connection with the puppet valve 1 of a motor engine indicated at 3, and the valve 1 coöperates with a seat at the port 2, for closing the said port. The valve and the seat are tapering or frusto-conical as shown, and the valve is provided with an axial stem 4. The stem passes through a guide sleeve or bearing 5 on the frame of the engine, and the outer end of the stem is adapted to contact with the adjacent end of a tappet 6, which is mounted to slide in a bearing sleeve 7 having a cylindrical bore and a frusto-conical periphery, and at the large or outer end of the sleeve an annular rib 8 is provided, which rests against the cylinder wall 9 at the opening 10 through which the tappet extends.

The tappet 6 has a head 11 at its outer end, and this head is engaged by a cam 12 on the cam shaft 13 of the engine. When the eccentric portion 12ª of the cam has its peripheral surface in contact with the tappet, the valve is opened to its widest extent, while when the head 11 of the tappet is on the concentric portion of the cam the valve is closed. A coil spring 14 is arranged between the outer end of the guide sleeve 5 and a stop on the stem, the said stop being in the form of a washer 15 and a nut 16, the nut holding the washer in adjusted position, and the nut is locked by means of a set screw 17 which passes through the nut into engagement with the stem. The lower end of the stem has a reduced extension 18, which is adapted to engage the head of a screw 19 which is threaded into an axial opening 21 in the upper end of the tappet 6.

A coil spring 22 is arranged between the spring 14 and a connecting plate 23, which is connected to the upper end of the tappet, by means of the set screw 19. This plate, as shown more particularly in Fig. 3, is provided at one end with an opening 24, and at the other end with a notch or recess 25, which extends from the end of the plate inward, and longitudinally of the plate. The spring 22 has a hook 26 at its lower end, which engages the opening 24 of the plate, and the plate is arranged on the upper end of the tappet with the set screw 19 received in the recess or notch 25. A lock nut 20 is threaded onto the set screw above the plate, and it will be evident that by turning down the set screw the plate may be clamped on the upper end of the tappet.

The upper end of the coil spring 22 is provided with a ring 27, the said ring being a split ring, and the ends 28 of the ring are lapped upon opposite sides of the adjacent end of the spring, and are secured thereto by means of a bolt and nut 29. The split ring 27 is engaged with two coils of the spring 14, the said coils being at approximately the center of the spring.

In operation, when the tappet 6 is moved toward the valve by the eccentric portion 12ª of the cam 12, the head of the set screw 19 will engage the reduced portion 18 of the stem, and the stem will be moved longitudinally to lift the valve. With the usual arrangement of puppet valve, when the tappet is lifted by the cam 12—12ª, there is a hammering or tapping sound produced between the adjacent ends of the tappet and the stem. The object of the present invention is to eliminate this disagreeable and unnecessary noise. Since the sound is caused by the relative movement of the stem 4 and the tappet 6, it will be evident that with the spring 22 connected at one end to the spring 14 and at the other end to the tappet, the adjacent ends of the tappet and the stem will at all times contact with each other. It has been attempted to eliminate this noise by providing the set screw 19 and adjusting the set screw with respect to the tappet to decrease the distance between the elements 18 and 19, that is between the tappet and the valve stem. It has been found, however, in practice that while the noise may be eliminated to some extent it cannot be eliminated entirely because of the fact that there is relative movement between the elements 4 and 6.

It will be evident from the above that the less space between the adjacent ends of the tappet and the stem the less noise would result, but it has been found in practice that when the elements 4 and 6 were approached near enough to reduce the noise materially, when the motor became heated this space would be so greatly lessened by expansion, that the valve would not be operated properly, and the valve would be held partly open, thus lessening the compression. It will be evident that with the arrangement of the spring 22, connected at one end with the spring which holds the valve closed and at the other end to the tappet, the parts will be held in contact whatever the position of the cam, and thus the tapping noise will be entirely eliminated. The elements 4 and 6 may, however, move away from each other, that is, they may yield to prevent any damage to the parts.

The improvement may be attached to existing engines without changing the engines themselves. Were the tappet not provided with the opening 21, the only change in the tappet would be the drilling of the said opening.

It will be understood that the ring 27 may be engaged with any coils desired of the spring 14, to give the desired tension of the spring 22.

In addition to eliminating the hammering or tapping produced between the tappet and the stem, the improvement will eliminate what is known as " side slap " of the tappet, caused by wear between the guide 7 and the tappet.

There is a tendency at the instant when the cam 12ª commences to lift the tappet, to pry the head 11 laterally, and there is a degree of noise caused by this prying movement, that is, by the engagement of the parts. This is especially true when the guide 7 has become worn as above stated. In practice, the spring 22 will be placed at that side of the valve stem and tappet toward which the cam 12ª is moving. Referring to Fig. 1, it will be seen from the indication of the arrow adjacent to the cam, that the cam is turning on its upper side from the right of the sheet to the left. This movement of the cam tends to pry the head 11 to the left, moving the upper end of the tappet to the right, and the spring 22 is arranged on the left of the tappet and stem, to counteract this tendency to lateral movement. Were the cam 12ª rotated in the opposite direction, the spring 22 would be on the opposite side. This change may be easily made, merely by detaching the split ring 27 from the coils and turning the plate 22, after which the split ring is engaged with the coils at the opposite side of the spring 14. The upward tension of the spring 22 and tappet 6 tends to draw the upper end of the tappet to the right of Fig. 1, forcing the tappet against the bore of the sleeve 7 at the right, and there is a similar pressure of the tappet against the bearing at the bottom of the sleeve toward the left. When now the cam starts to raise the tappet there could by no possibility be any slapping sound between the tappet and the bearing, even were the parts worn, since the spring 22 already holds the tappet in such position that at the first engagement of the cam the tappet will commence to move upward. Were the tappet resting by gravity on the cam, the first movement of the tappet would be a swinging movement on its long axis to take up the space between the bore of the sleeve 7 and the tappet.

I claim:

1. In an engine of the character specified, the combination with the puppet valve, the tappet and the cam for moving the tappet longitudinally to open the valve, said valve having an axial stem and the engine having a guide for the stem and a guide for the tappet for holding the said stem and the tappet in alinement, a spring arranged between the stem guide and the stem for normally holding the valve closed, and means for normally holding the tappet in engagement with the stem, said means being yielding for permitting the tappet to move away from the stem, said means comprising a spring, a split ring for engaging the first mentioned spring and pivotally connected to one end of the last named spring, a connecting plate connected with the opposite end of the last named spring at one end of the plate, said plate having a longitudinally extending recess at the other end, a set screw engaging the end of the tappet and passing through the recess, said set screw engaging the valve stem, and a lock nut on the set screw for clamping the plate to the end of the tappet.

2. In an engine of the character specified, the combination with the puppet valve, the tappet and the cam for moving the tappet longitudinally to open the valve, said valve having an axial stem and the engine having a guide for the stem and a guide for the tappet for holding the said stem and tappet in alinement, a spring arranged between the stem guide and the stem for normally holding the valve closed, and means for normally holding the tappet in engagement with the stem, said means being yielding for permitting the tappet to move away from the stem and having adjustable engagement with the said spring of the puppet valve stem.

3. In an engine of the character described, the combination with the puppet valve, the tappet and the cam for moving the tappet longitudinally to open the said valve, said valve having a stem and a controlling spring normally holding the same closed, of a laterally projecting arm carried by the tappet, and a spring for normally holding the tappet in engagement with the valve stem having one end thereof connected to the said arm and having engaging means at its opposite end for connection with the controlling spring of the valve.

4. In an engine of the character described, the combination with the puppet valve, the tappet and the cam for moving the tappet longitudinally to open the said valve, said valve having a stem and a controlling spring normally holding the same closed, of a laterally projecting arm carried by the tappet, and a spring for normally holding the tappet in engagement with the valve stem having one end thereof connected to the said arm, and a split clamping ring at the opposite end of the spring for engagement with selected convolutions of the spring of the valve stem.

ZENO ARNO BRUEGGER.

Witnesses to signature:
GEO. LEONHARDY,
VERA M. SMITH.

Copies of this patent may be obtained for five cents each, by addressing the "Commissioner of Patents, Washington, D. C."